(12) United States Patent
Hwang et al.

(10) Patent No.: US 7,284,028 B2
(45) Date of Patent: Oct. 16, 2007

(54) COMPARATOR ELIMINATING NEED FOR ONE'S COMPLEMENT LOGIC FOR SIGNED NUMBERS

(75) Inventors: Wei Hwang, La Verne, CA (US); Kun Wu, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 10/287,108

(22) Filed: Nov. 1, 2002

(65) Prior Publication Data
US 2004/0088591 A1    May 6, 2004

(51) Int. Cl.
G06F 7/50   (2006.01)
G06F 7/02   (2006.01)

(52) U.S. Cl. .................... 708/671; 340/146.2
(58) Field of Classification Search .......... 708/207, 708/671; 340/146.2
See application file for complete search history.

(56) References Cited

U.S. PATENT DOCUMENTS 4,760,374 A * 7/1988 Moller ................ 340/146.2
5,357,237 A  10/1994 Bearden et al.
5,944,771 A  8/1999 Shiraishi
6,907,443 B2 * 6/2005 Murray ................ 708/671

2002/0147755 A1  10/2002 Bhushan et al.

FOREIGN PATENT DOCUMENTS

GB   1218722   1/1971

OTHER PUBLICATIONS

N. C. Berglund et al., "Condition Code Handling", *IBM Technical Disclosure Bulletin*, Oct. 1979, vol. 22, No. 5, pp. 2045-2053.
B.D. Herrman, "MOSFET Look-Ahead Bit Incrementer/Decrementer," IBM Technical Disclosure Bulletin, vol. 28, No. 2 (Jul. 1985), pp. 741-742.

* cited by examiner

*Primary Examiner*—Chuong D. Ngo
(74) *Attorney, Agent, or Firm*—Daryl K. Neff, Esq.; Joseph P. Abate, Esq.

(57) ABSTRACT

An apparatus and method for providing high speed computing power with efficient power consumption in a computing environment comprising a comparator with at least one input feed; a sign selector in electronic communication with the comparator; and result flag generator in electronic communication with both the sign selector and the comparator. The sign selector has input data feeds and an equivalent number of dedicated indicators for identifying signed numbers from unsigned numbers for each of the input data feeds. The result flag generator receives a first resultant feed from the comparator and a second resultant feed from the sign selector. The sign selector can be designed to provide a resultant output. The resultant output is generated after collective operations have been performed on the input feeds and selectively on other feeds such as a sign feed and an Ini feed.

7 Claims, 3 Drawing Sheets

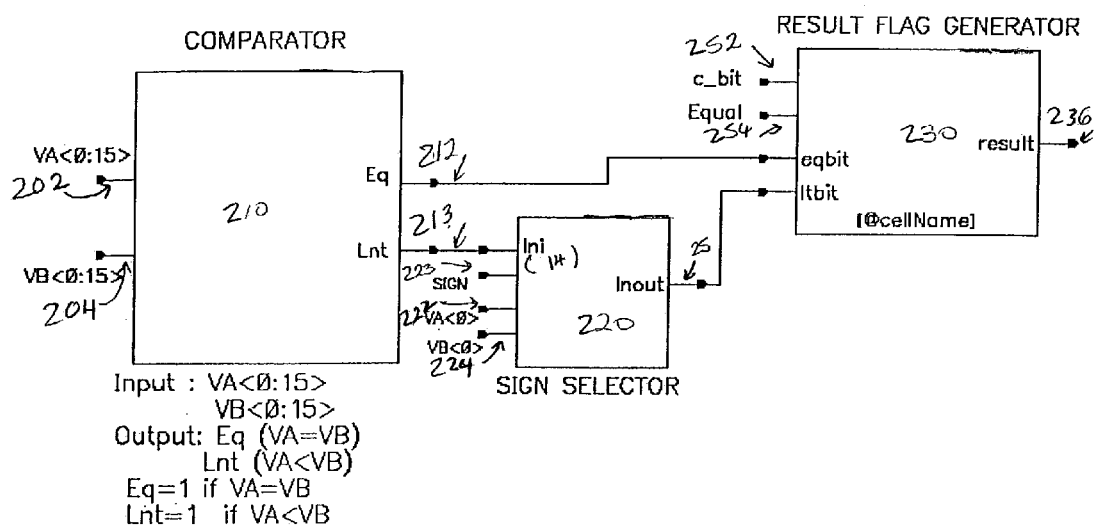
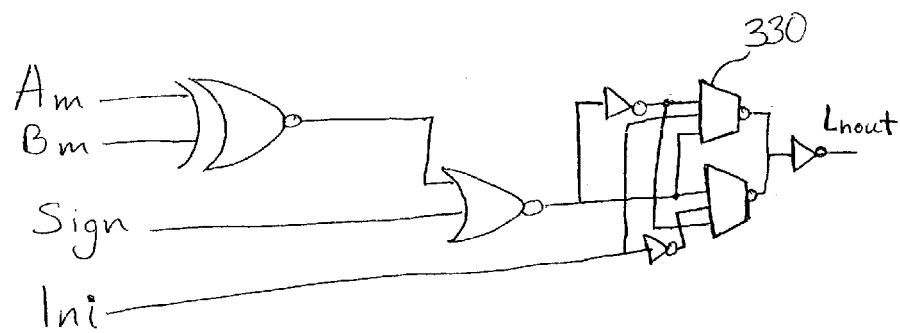

COMPARATOR ELIMINATING NEED FOR ONE'S COMPLEMENT LOGIC FOR SIGNED NUMBERS

FIELD OF THE INVENTION

This invention relates to data processing circuits and systems and more particularly, to digital signal processors, media processors or general purpose microprocessors employing vector or accumulator comparators in the data or instruction paths of digital signal processors, media processors or microprocessors.

BACKGROUND OF THE INVENTION

There is a continued need in the semiconductor industry to decrease the size of the IC devices. At the same time there is a demand for reducing power consumption while increasing the overall speed of operations. The needs for low power consumption along with reduced device sizes and increased operational speed pose a particular challenge in design of today's comparators.

The vector and accumulator comparators are usually part of the data paths of digital signal processor (DSP) chips and other similar devices. Comparator operations are directly controlled by the DSP after instructions are issued. Data operation in the comparator macro is conducted at DSP speed, usually in one clock cycle. Therefore, a low power and high speed DSP require low power and high speed data macros. The advent of super scale architecture for vector data path and accumulator data path. A 16-bit vector data path pipe consists of vector multiplier(s), vector adder(s), vector logic, vector shifter(s) and vector comparator macros. The 40 bit accumulator data-path pipe, by comparison, consists of saturating adder(s), accumulator logic and accumulator comparator macros. All data macros receive data simultaneously through the transition register barrier. Therefore, the need of low power and high speed comparators at different points in the data paths pose a challenge.

In addition, power and silicon areas for the comparator macro becomes significantly larger when the comparator goes from that of a simple integer non-signed use to floating point signed number use and non-signed use. An improved comparator should have the capability of doing both signed and non-signed numbers with the sign control signal telling the comparator macro if the data is signed or non-signed (i.e. The instruction is integer or floating point arithmetic). There is therefore a need for such an improved comparator design that can combine the high speed and low power demands of present semiconductor devices while supporting the decreased overall device sizes.

SUMMARY OF THE INVENTION

These and other objects are provided by the present invention for an apparatus and method for providing high speed computing power with efficient power consumption in a computing environment comprising a comparator with at least one input feed; a sign selector in electronic communication with the comparator; and result flag generator in electronic communication with both the sign selector and the comparator. The sign selector has input data feeds and an equivalent number of dedicated indicators for identifying signed numbers from unsigned numbers for each of the input data feeds. The result flag generator receives a first resultant feed from the comparator and a second resultant feed from the sign selector. The sign selector can be designed to provide a resultant output. The resultant output is generated after collective operations have been performed on the input feeds and selectively on other feeds such as a sign feed and an Ini feed.

BRIEF DESCRIPTION OF THE DRAWINGS

FIG. 2 is an illustration of a high level block diagram of one embodiment of the present invention;

FIG. 3 is an illustration of one embodiment of the present invention s provided by FIG. 2;

DETAILED DESCRIPTION OF THE PREFERRED EMBODIMENTS

Figure 1:
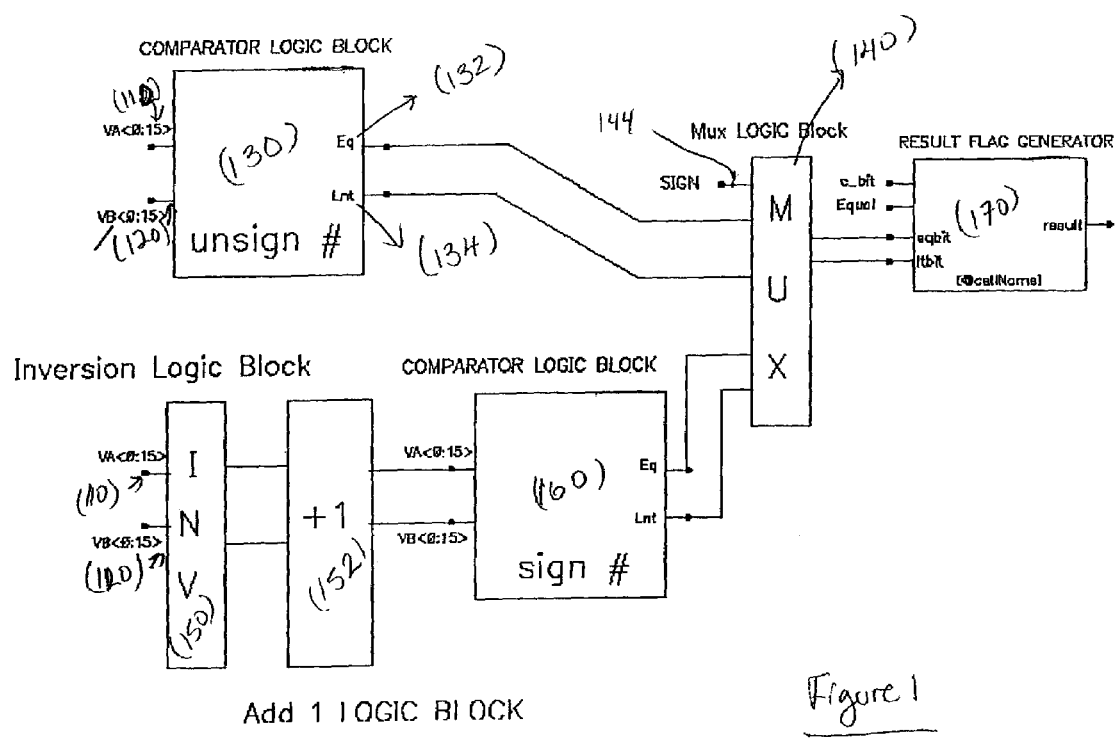
FIG. 1 is an illustration of a typical block diagram of a comparator performing signed and unsigned number operations as provided in the prior art.

FIG. 1, is an illustration of a typical comparator as provided in the prior art. Data inputs are 16 bit numbers VA<0:15> and VB<0:15> as shown at (110) and (120) respectively. If the data is signed the most significant bits VA<0> and VB<0> will indicate the sign of the number. If the data is non-signed the sign control signal will be a "0" and V<0> and VB<0> will be the most significant bit of the number. Note that the non-signed numbers are 16 bits and the signed numbers are actually 15 bits plus the sign bit.

In FIG. 1, the logical compare of unsigned numbers is performed that portion of the block diagram consisting of the upper comparator logic block (130) which operates on 16 bit data inputs Va<0:15> and Vb<0:15>. This comparator block has two output pins Eq("1" when Va=Vb) and Lnt ("1" when Va<Vb) as shown at (132) and (134) respectively. These results are then fed into a multiplexer (MUX) as shown at (140) that is controlled by the SIGN bit input, shown as (144). These inputs are then selected and transferred to the MUX output if SIGN="0" is being performed (i.e. Meaning that a nonsigned comparison is being performed).

The logical operation of the Result Flag Generator (shown at (170)) is shown in the Table A, below. (Note that the Result Flag Generator block is used in both the prior art solution and the present invention.)

TABLE A

Truth Table for Result Flag Generator

| C Bit, | Equal | 0, 0 | 0, 1 | 1, 1 | 1, 0 |
|---|---|---|---|---|---|
| A = B, (Eg) | A < B (Lnt) | | | | |
| 0, | 0(A > B) | 0 | 0 | 1 | 1 |
| 0, | 1(A < B) | 1 | 0 | 1 | 0 |
| 1, | 1 | X | X | X | X |
| 1, | 0(A = B) | 0 | 1 | 0 | 0 |

The signed comparator operation of the prior art solution becomes much more complex in terms of the circuitry required to perform the compare operations. In FIG. 1, Va and Vb are first inverted (2×16=32 inverters) as shown at (150) to produce the "one's complement". This is followed by an adder shown at (152) that adds a 1 to Va and/or Vb depending on the sign of Va or Vb. The result in turn is then fed into another logical comparator, shown at (160), the same as that used for the unsigned operation. The result of the compare is then fed into a multiplexer (MUX) as shown at (140) and transferred to the output of the MUX if the MUX SIGN control bit is a "1" (meaning signed operation is being performed). The multiplexer output is then provided to the Result Flag Generator (170) which, based on further inputs (C bit and Equal) then outputs a result as indicated in Table A above.

FIG. 2 is a high level block diagram of one embodiment of the present invention. In this embodiment, a comparator logic shown at (210) and a Result Flag Generator shown at (230) are used in conjunction with a new block referenced to as the Sign Selector and shown at (220). Table B below shows the logic truth table for the Sign Selector. The Sign Selector receives the most significant bits of the numbers VA and VB as inputs VA<0> (222) and VB<0> (224), respectively. These bits are denoted Am and BM, respectively, in Table B below and in FIG. 3. VA<0> is the sign of the number VA when VA is a signed number. Similarly, VB<0> is the sign of the number VB when VB is a signed number. A sign feed is also provided to Sign Selector 220, as shown at (223). If VA<0>="1", i.e., AM="1", then input VA<0:15> to Comparator 210 is a positive number. The Comparator 210 is in electronic communication with the Sign Selector through the output 213 of the Comparator which is input to the Ini input 214 of the Sign Selector. The Comparator also outputs a bit Eq (212) to the Result Flag Generator 230. The Inout of the Sign Selector shown at 25 is another feed into the Result Flag Generator. These feeds alongside other feeds—when in existence—such as the ones shown at (252) and (254) are combined to create a last result output as shown at (236).

TABLE B

Truth Table for Sign Selector

| Sign | Am | Bm | Lnout |
|------|----|----|-------|
| 0 | x | x | lni |
| 1 | 0 | 0 | lni |
| 1 | 0 | 1 | N-lni |
| 1 | 1 | 0 | N-lni |
| 1 | 1 | 1 | lni | lni = 1 when VA < VB. lni = 0 when VA > VB. The value N-lni is the negative (binary opposite) of the value lni.

Table C below provides a device comparison table for a "16" bit device which compares the circuit gate count for the embodiment of the present invention as shown in FIG. 2 versus the prior art examples such as the one provided in FIG. 1.

TABLE C

Device Comparison Table for 16 bit Design

| Gate Level | | Transistor level |
|------------|---|------------------|
| Design as provided by present invention | 126 | 542 |
| Prior art (traditional)/ design | 592 | 1,920 |
| Savings (%) | 78.72% | 71.77% |

*Savings = (T − N)/T

As provided in Table C, there is substantial improvement due to implementation of the embodiment of FIG. 2 as provided by the present invention.

Figure 4:
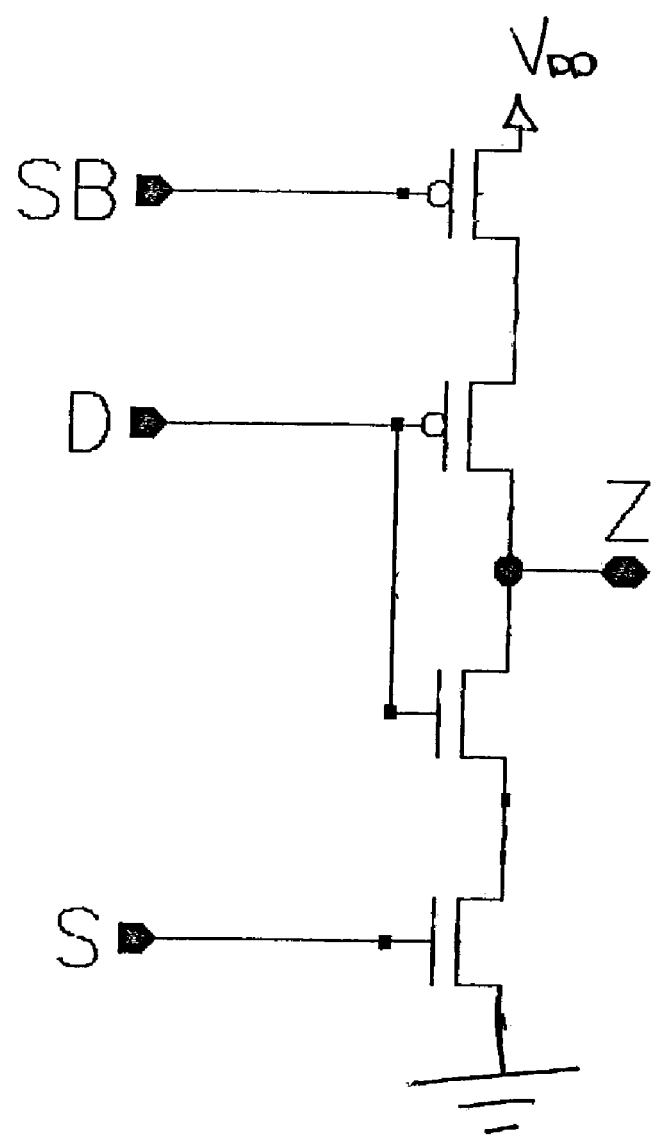
FIG. 4 is an illustration of a diagram showing details of an inversion MUX 330, such as that shown in FIG. 3.

FIG. 3 is an embodiment of the present invention showing the Sign Selector of the embodiment provided in FIG. 2 in greater detail. Other embodiments are achievable and the embodiment of FIG. 3 is provided as an example. FIG. 4 illustrates the details of the inversion MUX 330 such as the one shown in FIG. 3. While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A comparator circuit operable to compare values of a first number and a second number, the first and second numbers being either unsigned numbers or signed numbers, the comparator circuit comprising:

a comparator operable to receive a first number and a second number and operable to output a first result indicating whether or not the first number is equal to the second number, and a second result indicating whether or not a magnitude of the first number is less than a magnitude of the second number;

a sign selector operable to receive a sign of the first number when present, a sign of the second number when present and the second result output by the comparator, the sign selector operable to output a modified result, the modified result indicating which of the first number and the second number has lesser value, considering the signs of the first and second number; and a result flag generator, the result flag generator operable to receive the modified result and the first result and to output a final result indicating whether the first number is a) equal to the second number, b) less than the second number, c) or not equal to and not less than the second number.

2. The comparator circuit as claimed in claim 1, wherein the result flag generator is further operable to receive an external equal bit signal, wherein the final result indicates whether the first number is equal to the second number further based on the state of the external equal bit signal.

3. The comparator circuit as claimed in claim 1, wherein the result flag generator is further operable to receive a C bit signal, wherein the value of the final result takes into account the state of the C bit signal.

4. The comparator circuit as claimed in claim 1, wherein the sign selector is operable to receive a third sign input, wherein the modified result is further based on the state of the third sign input.

5. The comparator circuit as claimed in claim 1, wherein each of the first number and the second number is a binary number having a plurality of bits.

6. The comparator circuit as claimed in claim 5, wherein the sign selector is operable to receive the first bit of the first number as the sign of the first number and is operable to receive the first bit of the second number as the sign of the second number.

7. The comparator circuit as claimed in claim 6, wherein the first bit of the first number occurs in a position of a most significant bit of the first number and the first bit of the second number occurs in a position of a most significant bit of the second number.

* * * * *